United States Patent [19]
Freeman

[11] Patent Number: 4,748,674
[45] Date of Patent: May 31, 1988

[54] PATTERN LEARNING AND RECOGNITION DEVICE
[75] Inventor: Walter J. Freeman, Berkeley, Calif.
[73] Assignee: The Regents of the University of Calif., Berkeley, Calif.
[21] Appl. No.: 916,187
[22] Filed: Oct. 7, 1986
[51] Int. Cl.[4] .............................................. G06K 9/62
[52] U.S. Cl. .......................................... 382/14; 382/15
[58] Field of Search .................................... 382/14, 15
[56] References Cited
U.S. PATENT DOCUMENTS
3,646,329  2/1972  Yoshino et al. ...................... 382/14
4,504,970  3/1985  Werth et al. ......................... 382/14

Primary Examiner—James J. Groody
Assistant Examiner—Michael D. Parker
Attorney, Agent, or Firm—Ciotti & Murashige, Irell & Manella

[57] ABSTRACT

A pattern learning and recognition device. The device includes a parallel processing network for receiving and processing an N-dimensional vector input, and a control system for calculating, and storing output signal correlation information during the learning mode of the device, and for distributing the learned information to the network, in the form of feedback gain, during the pattern-recognition mode of the device. The network is preferably composed of an array of N oscillatory units designed to bifurcate from a rest to an active state when stimulated with a threshold input voltage surge.

12 Claims, 4 Drawing Sheets

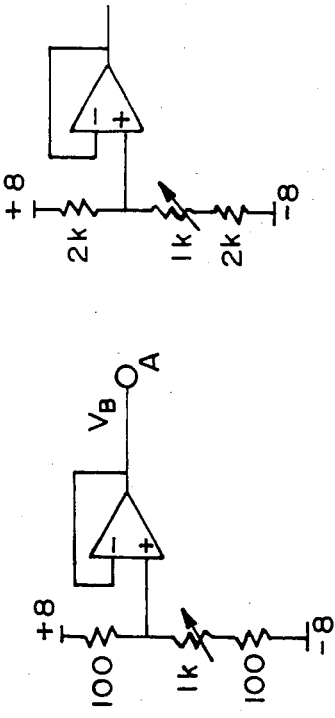
FIG. 3A
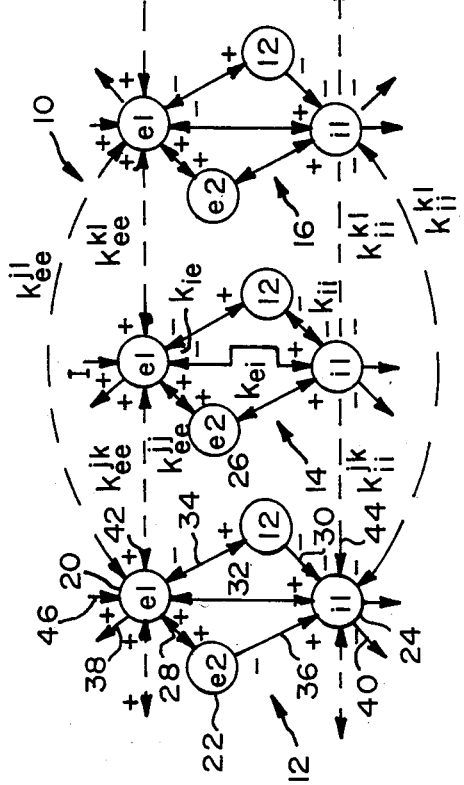
FIG. 1
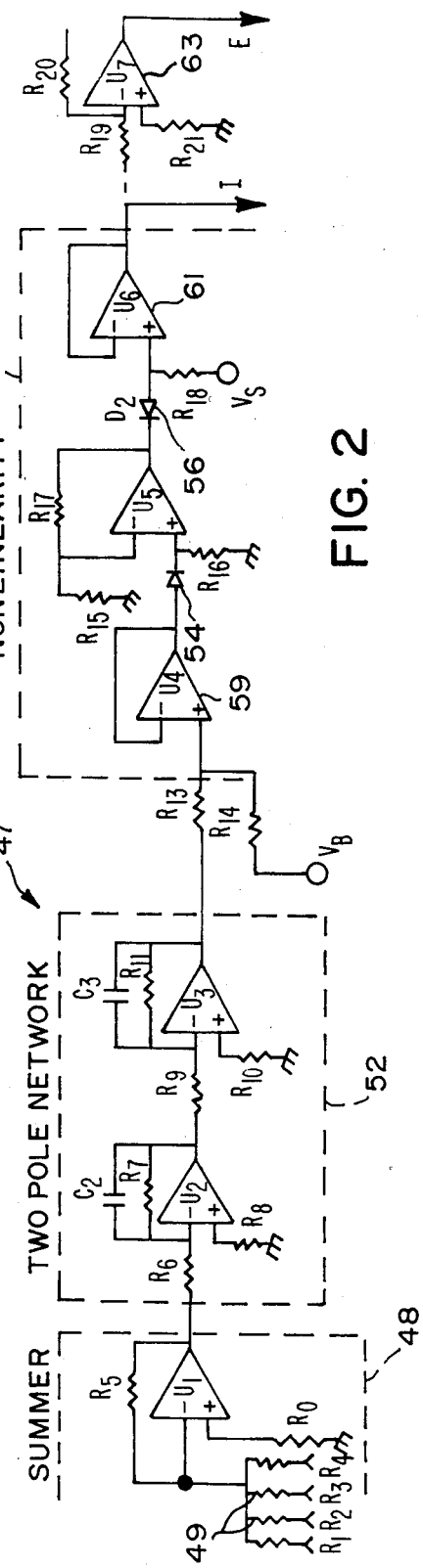
FIG. 3B
FIG. 2

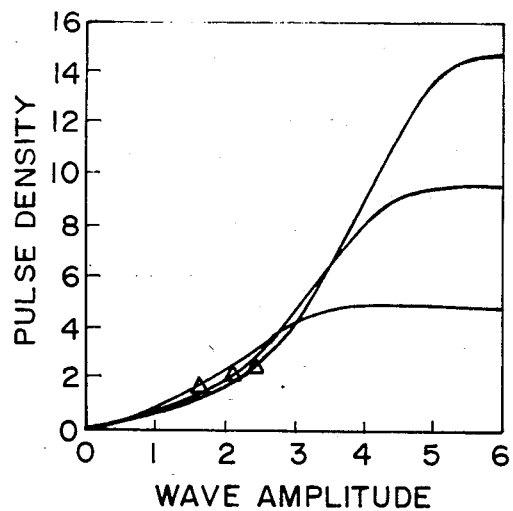
FIG. 4A
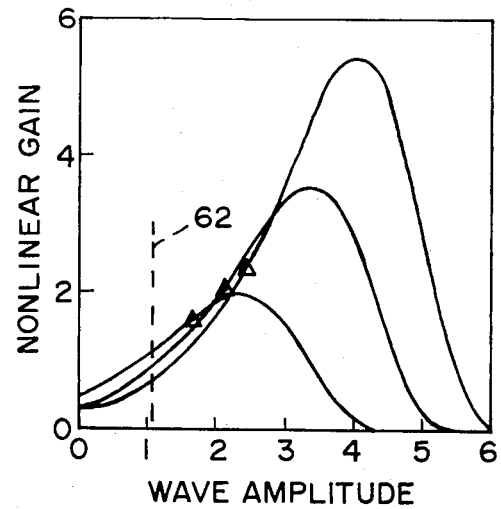
FIG. 4B
FIG. 5A
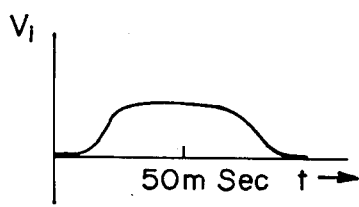
FIG. 5C
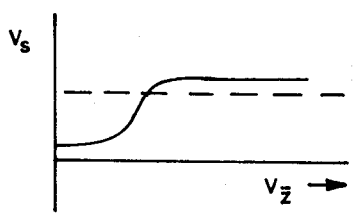
FIG. 5E
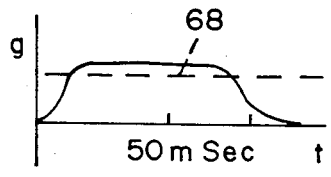
FIG. 5B
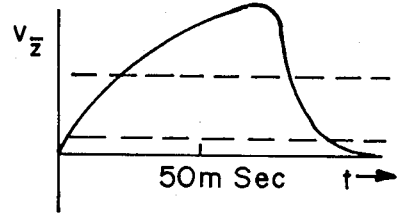
FIG. 5D
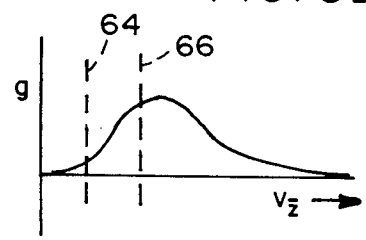
FIG. 5F
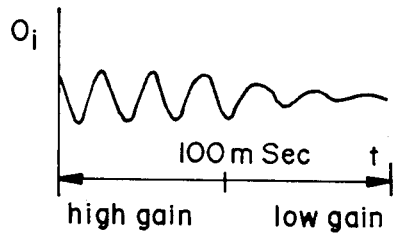

PATTERN LEARNING AND RECOGNITION DEVICE

The project relating to this invention was funded in part by grant # MH066861 from the National Institutes of Mental Health. The government has certain rights in this invention.

FIELD OF THE INVENTION

The present invention relates to the field of pattern learning and recognition devices, and in particular, to devices based on parallel, multi-unit architecture.

BACKGROUND OF THE INVENTION

Pattern learning and recognition has a number of potentially important applications, including computer recognition of spoken words, robotics vision and guidance and scene classification. Most existing pattern recognition devices are based on serial computational architectures. They involve the use of algorithms of feature extraction and comparison or correlation of extracted features from an input pattern with a store of archtypal features in a memory. Their shortcomings include the lack of robust ability to generalize from incomplete, noisy, or distorted features; lack of versatility in assembly of features into whole patterns, excessive time for search; lack of robust rules for association; and the requirement for an exhaustive search to report on a novel pattern which is not in the memory.

More recently, connected network devices designed for pattern learning and recognition have been proposed. Generally, these devices are composed of an array of processing units having extensive feedback interconnections between pairs of units, where the strength of the individual feedback connections determines the learned state of the device. When an N-dimensional input vector, representing a pattern to be recognized, is applied to the device, the system is driven from an unstable initial state to an unstable final state which represents one of the one or more possible point attractor states of the device. That is, the feedback connections define one or more basins to which the system is driven with any input, this basin representing one of the possible patterns or "solutions" recognized by the device.

The capabilities of these devices are not yet fully explored, but they have a number of limitations. In terms of physical structure, the feedback connections between pairs of units severely limits the practical size of the array, since an N unit array can have up to $N^2$ pairwise connections. Secondly, changing the values of the feedback connections, to create a new learned state, requires relatively complex variable resistance or variable gain elements which complicate construction, by very large systems integration (VLSI) techniques.

The requirement to go full "on" and full "off" requires stopping and restarting the device for each new input. The steady d.c. signal outputs are unstable and difficult to control and adjust in analog systems. The devices need an external source of noise to minimize selection bias and hang-ups on local minima, and there may be a need to lower or remove noise by independent controls during the convergence process.

SUMMARY OF THE INVENTION

One general object of the present invention is to provide a parallel-circuit pattern learning and recognition device which substantially overcomes or eliminates above-discussed problems and limitations associated with parallel-processing devices known in the prior art.

A more specific object of the invention is to provide such a device in which the maximum physical connections in an N-unit device is 2N, allowing devices with a very large number of units (1,000 or more) to be constructed by practical VLSI methods.

A related object of the invention is to provide such a device in which learned feedback connections are made readily in the form of an entry into a digital memory, rather than a change in the physical properties of the device circuit.

Still another object of the invention is to provide such a device in which the N units are designed to bifurcate collectively above a threshold input gating voltage or "surge", and the learned state or states in the devices are attractors characterized by a distinctive pattern of spatio-temporal outputs in the N units.

Still another object of the invention is to provide such a device that bifurcates from a resting point or chaotic attractor state to some high-amplitude point, chaotic or limit cycle attractor state, in response to an input surge, and which returns to its resting or chaotic state at the cessation of the input surge.

The device of the invention is designed for learning and recognizing patterns which can be represented in the form of an N-component input, i.e., an N-dimensional vector input. The device includes a signal processing network designed for parallel processing of the input signal, and a digital control system which functions to sample, analyze and store information from the network during learning, and to apply the stored information to the network during pattern recognition The network is made up of an array of N integrative units $U_j$, each constructed to respond to the jth component of the input vector, to produce a time varying output signal $O_j$. The units in the network preferably include an integrator whose output is connected to a pair of opposed-polarity diodes in the unit, to produce an output signal $O_j$ with bilateral saturation characteristics. The gain of each unit is voltage dependent and at rest is set well below the maximum unit gain, at which the unit bifurcates from a rest stable state, to an active stable state. When the input components are voltage surges, the units which receive an excitatory-level step cause the entire network to bifurcate to the active state, and return to the stable, resting bias condition after cessation of the step.

In a preferred embodiment, the units are oscillatory units, each composed of an excitatory element, an inhibitory element, and a negative feedback connection between the two, such that the application of an excitatory-level voltage surge input to a unit produces an oscillatory output signal (convergence to a limit cycle attractor) which quickly decays after cessation of the surge. Each of the excitatory and inhibitory elements is constructed, as above, to produce a bilaterally saturated output. The excitatory and inhibitory elements may have destabilizing feedback, by self or mutual excitation or self or mutual inhibition, respectively.

Input to the network is preferably through an input stage in which a carrier wave is generated which consists of a gate or step with rounded edges, called a "surge", that starts and stops the device in a time frame lasting on the order of 0.1–1.0 seconds. The surge input signal may repeat regularly or at selected intervals. The amplitude of the surge, at each of the N units in the network, is determined by a sensor or other input device. The N-dimensional vector is thereby expressed by the amplitude modulation of the surge given concomitantly to all of the elements of the array, including the possibility for zero and negative amplitudes. The magnitude of the surge is limited both locally and globally by suitable normalizing transforms so as to preserve input patterns while keeping the input domain within the optimal dynamic range of the device.

The control system in the device includes a multiplexer for sampling the outputs of each integrative unit sequentially. In the case of an oscillatory output, the units are each sampled at a rate at least four times the oscillation frequency. In the learning mode of the device, the sampled values are used to calculate cross-correlation coefficients $k_{ee}{}^{jk}$ between pairs of receptor units $U_j$, $U_k$. These values are stored in a memory as a matrix of correlation coefficients which represent the learned information. In effect the matrix values represent learned feedback gain connections between pairs of receptors $U_j$, $U_k$ in the network.

In the pattern recognition mode, the output of each unit is sampled by the multiplexer, and each sampled value is used to weight (amplify or attenuate) feedback input signals which relate that output value $O_j$ and the $k_{ee}{}^{jh}$ coupling coefficients between $U_j$ and other units $U_k$ in the network. The weighted feedback signals are distributed by a demultiplexer in the control system to each of the feedback-linked units $U_k$, providing pairwise output-to-input feedback from each sequentially sampled units to all other feedback-linked units. The multiplexing and demultiplexing thus provides pairwise feedback connections between the units during operation, even though the network itself does not contain physical interconnections between the units.

In another aspect, the invention includes a machine-assisted method for processing patterns which are representable as N-dimensional vectors. The method involves applying the vector input signals to a network of the type described above, and sequentially sampling the signal output $O_j$ values in each of the N units. For each sampled value, there are calculated feedback input signals which relate the sampled value and $k_{ee}{}^{jk}$ coupling coefficients between $U_j$ and other units in the device. These feedback signals are applied to each of the corresponding units $U_k$ in the network, before the next signal output (from the $U_{j+1}$ unit) is sampled.

These and other objects and features of the invention will become more fully apparent when the following detailed description of the invention is read in conjunction with the accompanying drawings.

BRIEF DESCRIPTION OF THE DRAWINGS

FIG. 1 is a schematic diagram of three integrative units in a network designed according to one preferred embodiment of the present invention;

FIG. 2 is a schematic diagram of a hardware realization of an excitatory or inhibitory element in the integrative units of FIG. 1;

FIGS. 3A and 3B show power output devices for the FIG. 2 element;

FIG. 3 shows plots of nonlinear functions produced by the excitatory element of FIG. 2 (4A), at three different saturation values, and the corresponding nonlinear gain curves (4B) of the element;

FIGS. 5A–5F show signal-processing steps and signal characteristics associated with an integrative unit in the network;

DETAILED DESCRIPTION OF THE INVENTION

Figure 6:
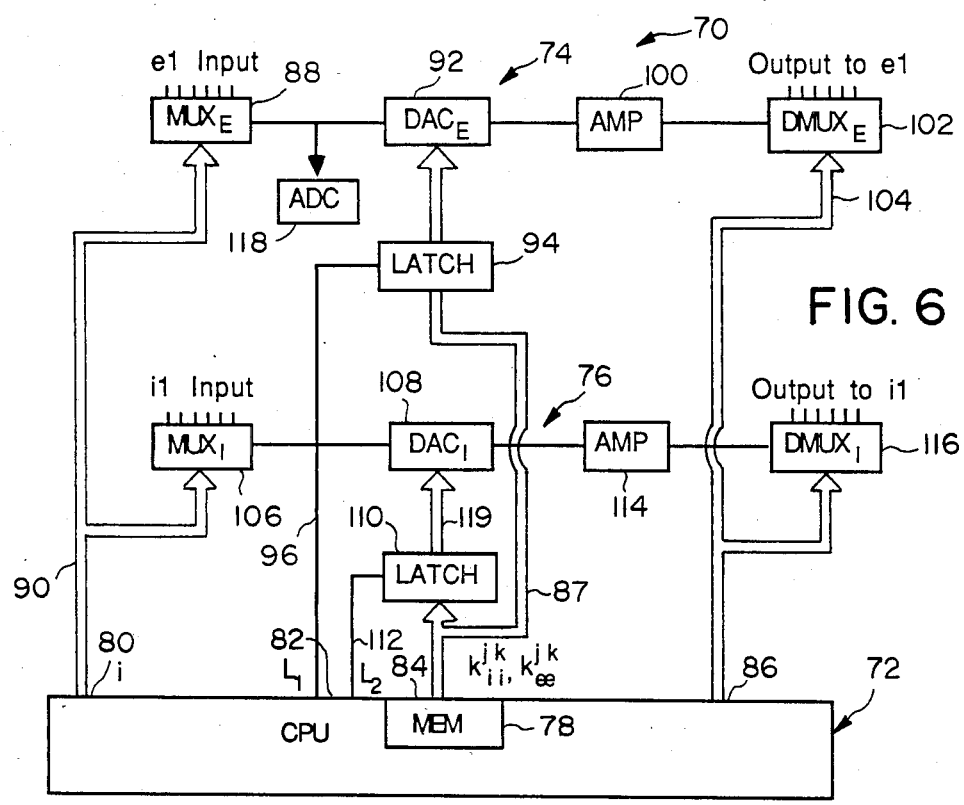
FIG. 6 is a schematic diagram of the control system of the invention.

The device of the invention includes a multi-unit network designed for parallel processing of N-dimensional vector inputs, and a digital-processing control system for calculating, storing, and distributing feedback information to the network during network operation. Section I describes the network and its signal response characteristics; Section II, the control system; and Section III, the operation of the invention in pattern learning and pattern recognition and reconstruction modes.

I. Multi-Unit Network

FIG. 1 shows a portion of a network 10 constructed for use in the pattern learning and recognition device of the invention. The network is composed of an array of N integrative units $U_j$, $j=1$ to N, such as units 12, 14, and 16. Unit 12, which is representative includes a pair of excitatory elements 20, 22, denoted generally e1, e2 in the figure, and a pair of inhibitory elements 24, 26, denoted generally i1 and i2 in the figure. The design and operational characteristics of the elements will be described below with reference to FIGS. 2 and 4.

With continued reference to unit 12 in FIG. 1, the four elements in the unit are interconnected as shown to provide either excitatory (non-inverted voltage) or inhibitory (inverted voltage) feedback to other elements in the unit. The sign of the feedback voltage is indicated in the drawing, either "+" for excitatory, or "−" for inhibitory. As seen, the feedback connections include: (a) a pair of connections 28 between e1 and e2 for mutual excitation; (b) a pair of connections 30 betwen i1 and i2 for mutual inhibition; and (c) pairs of connections 32, 34, 36, between excitatory and inhibitory elements, for providing excitatory feedback from the excitatory to the inhibitory elements, and inhibitory feedback in the reverse direction. The feedback signals are inputted through separate input terminals in the excitatory and inhibitory elements.

In an alternative embodiment, the mutual excitation between e1 and e2 elements, and mutual inhibition between i1 and i2 units is accomplished by autoexcitation of a single excitatory element (e1), and autoinhibition of a single inhibitory element (i1), respectively. This simplified embodiment thus includes only the e1 and i1 elements in each unit, where the various feedback connections between excitatory and inhibitory units, other than e1 and i1, are replaced by autoexcitation of the e1 element and autoinhibition of the i1 element.

Also shown in the figure, in dotted lines, are feedback associations between pairs of units, such as units 12, 14, units 14, 16, and units 16, 18. Feedback between j and k excitatory elements are designated $k_{ee}{}^{jk}$, which represents the coupling coefficients between signal outputs of $e1_j$ and $e1_k$. Similarly, feedback between j and k inhibitory elements are designated $k_{ii}{}^{jk}$, which represents the coupling coefficients between signal outputs of i1$_j$ and i1$_k$. These feedback associations provide mutually excitatory feedback between pairs of e1 elements, with a gain which is proportional to $k_{ee}{}^{jk}$, and mutually inhibitory feedback between pairs of i1 elements, with a gain proportional to $k_{ii}{}^{jk}$. The role and strengths of the feedback connections will be discussed below.

According to an important feature of the invention, the feedback associations between the pairs of e1 and i1 elements in the network are provided by multiplexing and demultiplexing operations carried out by the control system, as will be described in Section II. In the multiplexing/demultiplexing operation, the outputs of each set of e1 and i1 elements in the network are sampled by separated multiplexers. The e1 elements are sampled from output terminals, such as terminal 38 in unit 12, and the i1 elements, from output terminals, such as terminal 40 in unit 12. Similarly, each e1 element has an input terminal, such as terminal 42 in unit 12, for receiving feedback signals from a demultiplexer associated with the e1 elements, and each i1 unit has an input terminal, such as terminal 44 in unit 12, for receiving feedback signals from a demultiplxer associated with the i1 elements.

In addition to the signal inputs related to the above feedback connections and associations, each e1 element has an input terminal, such as terminal 46 in unit 12, for receiving a pattern-related input voltage surge during a learning or pattern-recognizing operation. The pattern to be learned or recognized is represented as an N-dimensional vector whose N vector components are applied to corresponding N units in the network.

The desired size (number of units) of the network will be governed by the nature of the pattern, i.e., dimensionality of the pattern-related vector, the amount of information required to distinguish patterns of interest, and, in very large networks, by multiplexing/demultiplexing speed limitations. Networks having as few as eight units show many of the interesting pattern learning and recognition properties which are characteristic of the invention. Larger networks, having up to 500-10,000 units are feasible using very-large systems integration (VLSI) design techniques, and systems of this size are compatible with the operating speeds of current multiplexing and demultiplexing devices.

In turn, the size of the network may effect its design requirements. In particular, the advantages of mutually excitation or autoexcitation and mutual inhibition or autoinhibition within a network unit become relatively less important in a large network, where each e1 and i1 element is also receiving feedback signals from a large number of pairwise-associated units (through the operation of multiplexing and demultiplexing). Thus in large networks, the network may be simplified to a single e1 and i1 element with excitatory feedback from e1 and i1, and inhibitory feedback in the opposite direction.

FIG. 2 shows a schematic circuit diagram of a preferred element (either excitatory or inhibitory) for use in constructing network 10. The element, which is designated generally at 47, includes a summer 48 which receives input from one or more of the input terminals shown at 49. The inputs in the element shown are for an e1 element, and include a signal input terminal (identified by R$_1$); a $k_{ee}{}^{jk}$ feedback signal terminal (R$_2$); a $k_{ee}$ self or autoexcitation input terminal (R$_3$); and an inhibitory $k_{ie}$ input terminal (R$_4$). The resistors R$_1$, R$_2$, R$_3$, and R$_4$ in the inputs are selected, in relation to resistor R$_5$, to provide appropriate input gain to the element, as determined by the ratio of the input resistor/R$_5$. Preferred gain values for the various feedback connections within a unit are between about 0.3 and 2.0, with the $k_{ee}$ and $k_{ii}$ values being initially set to 0.5 (R$_3$/R$_5$), and the $k_{ei}$ and $k_{ie}$ values (R$_4$/R$_5$) being initially set to 1.0, and adjusted as necessary to achieve desired oscillatory characteristics in the unit, due, for example, to the tolerances of the circuit components. Both R$_1$ (the signal input terminal) and R$_2$ (the interunit feedback terminal) are both set equal to R$_5$, with the gain of the voltage applied to the element being determined by the voltage value of the pattern signal or feedback gain applied to the terminals.

The fixed feedback gain values (R$_3$ and R$_4$) may be adjusted to vary oscillatory characteristics in the units. In general, $k_{ee}$ should be equal or less than $k_{ii}$. Increasing $k_{ee}$ makes the system more sensitive to signal input voltages. The lower oscillatory frequency resonse of the system produced by increasing $k_{ee}$ is offset by increasing $k_{ii}$. Increasing the excitatory $k_{ei}$ or the inhibitory $k_{ie}$ gain acts to move the network (considering all of the units as a linked system) toward a state which (a) can be driven to oscillation at a lower input voltage surge and (b) oscillates with a higher frequency. Conversely, reducing $k_{ei}$ or $k_{ie}$ moves the system away from its oscillatory state.

The summer output is fed to a two-stage integrator 52, (or alternatively, a one-stage integrator) which functions to integrate the summed input over the duration of the input. The integrator has the design shown, where U$_2$ and U$_3$ are multi-purpose op amps carried on a single IC chip, such as a Texas Instruments TL075 chip. The time constants of the two integrator stages are set by the values of the resistors and capacitors shown, where preferred values are as given below.

According to an important operational feature of the element, the signal output of the element is a non-linear output with bilateral saturation, i.e., a sigmoidal voltage response. The sigmoidal output is produced by a pair of opposed-polarity diodes 54, 56, in a non-linear subcircuit 57, which also includes a pair of op amp buffers 59, 61, which isolate the diode output voltage. The resting bias of the non-linear output (discussed below) is set by voltage V$_B$ supplied from a conventional DC powder source, shown in FIG. 3A. A preferred voltage potential V$_B$ is abut 1 volts. The saturation level of the output, also discussed below, is set by voltage input at V$_S$, supplied by a conventional DC power source, shown in FIG. 3B. A preferred voltage V$_S$ is about 1.2 volts.

Completing the description of element 47, the output from diode 56 is directed through a voltage invertor when the output of the element is used for inhibitory output, i.e., an i1 or ie element. For an e1 or e2 unit, the output is taken ahead of the invertor as indicated.

All of the op amps U$_1$ through U$_7$ shown in the circuit are multi-purpose op amps carried on IC chips, such as a Texas Instruments TL075 chip. IN4007 diodes (Texas Instruments, Dallas, TX) are suitable. Typical values for the resistors and capacitors connected to the chip to make the integrator are as follows:

| | |
|---|---|
| R$_0$ - 5K | C$_1$ - .01 μF |
| R$_1$ - 10K | C$_2$ - .001 μF |
| R$_2$ - 10K | C$_3$ - .01 μF |
| R$_3$ - 5K | C$_4$ - .3 μF |
| R$_4$ - 10K | |
| R$_5$ - 10K | |
| R$_6$ - 5 M | |

-continued

R₇ - 10 M
R₈ - 5 M
R₉ - 10K
R₁₀ - 10K
R₁₁ - 50K
R₁₂ - 5 M
R₁₃ - 5 M
R₁₄ - 5 M
R₁₅ - 5K
R₁₆ - 5K
R₁₇ - 10K
R₁₈ - 10K
R₁₉ - 7K
R₂₀ - 1K
R₂₁ - .5K

FIG. 4A below shows typical sigmoidal output curves relating input voltage to output voltage, where the three curves have progressively greater sigmoidal saturation, due to higher voltage $V_S$ levels in the FIG. 2 element. Both the input and output functions are continuous time functions. The nonlinear gain of the circuit, determined by the differential of the output with respect to the input voltage, is shown in FIG. 4B for each of the FIG. 4A voltage output curves. As seen, the maximal gain is roughly proportional to the saturation, and is shifted to the right (higher voltage input) with greater saturation.

According to an important feature of the network, the resting biases (the zero voltage biases) are set substantially below the input voltage at which maximal gain occurs. This feature allows the network to bifurcate from low-level stable resting condition to a stable high-level state, in response to input signals which raise the gain of the elements to maximal or near-maximal levels, and similarly, to return to the resting condition, when the input signal components drop below the threshold excitation level. The resting gain level of the element is indicated by the dotted line in FIG. 4B. The position of the resting gain is set by variable resistance in the power supply element shown in FIG. 3A. Here it is noted that the $V_B$ and $V_S$ voltage outputs from the FIGS. 3A and 3B power sources, respectively, are applied to all elements of the network, so that each element has about the same sigmoidal saturation and resting bias, and any adjustment made in $V_S$ and $V_B$ is applied to all of the elements. It is also noted that the gain-dependent voltage response of the element is fully compatible with different sigmoid functions, such as the logistic curve, the cubic polynomial, and the hyperbolic tangent.

The signal processing and response characteristics of an isolated unit, such as unit 12, will be described with reference to FIGS. 5A–5F. FIG. 5A shows a typical voltage surge which is applied to an e1 network element. The voltage surge is one of the N components of a N-component vector, representing a pattern to be learned or recognized, during a learning or pattern-recognition mode of the device. The input signal, denoted at $V_i$, has a typical surge duration of about 100 msec, and is smoothed at its edges to prevent abrupt voltage responses in the network which can lead to spurious oscillations.

The input voltage is summed and integrated by the element, yielding the integrated signal indicated at $V_z$ in FIG. 5B. In actual operation, the integrated voltage is the summed signal appied to the elements through the two or more input terminals, although in the present discussion, only the single pattern-related input is being considered.

The voltage levels indicated by the lower and upper dotted lines in the figure are the voltage asymptotes of the sigmoidal (bilaterally saturated) output of the element. This output curve, as a function of $V_z$, is shown at $V_s$ in FIG. 5C. The derivative of this curve, with respect to $V_z$, gives the voltage dependent gain curve seen in FIG. 5D. The two voltage levels indicated by dotted lines in FIG. 5D represent the resting bias (line 64) and a threshold voltage level (line 66) which is sufficient to cause the network unit to bifurcate from a stable, resting condition to an oscillatory condition. That is, when the voltage-dependent gain in the system goes above the threshold level, the signal response in the e1 element is sufficient to drive the unit containing that element into oscillation. Here it is emphasized that in the actual operation of the network, each e1 unit receives voltage input from feedback as well as pattern-related signal components, so that the "switching" of a unit from a non-oscillatory to oscillatory state is dependent on global bifurcation and will occur even if the pattern-related input signal component applied to that unit is quite small locally.

The oscillation in any unit, and in the system as a whole, does not go unstable (blow up) after bifurcation, because of the voltage-dependent gain characteristic of the output of each element, which maintains the system within a relatively narrow voltage level about the maximum gain, during the input voltage surge. The time-dependent gain in the element is shown in FIG. 5E, where the gain level indicated by the dotted line 68 is the threshold gain level which produces bifurcation to the oscillatory state. Thus, assuming that the only input to e1 is the pattern related signal component, the unit will oscillate during the period when the gain is above the threshold level. FIG. 5F shows the resulting oscillatory signal. As seen, the signal oscillatory signal decays over about a 100 msec interval as the unit is switched to a subthreshold gain level.

It will be appreciated that the oscillatory signal response of the system is due to basic configuration of e1 and i1 elements connected for excitatory and inhibitory cross feedback, as shown in FIG. 1. In the oscillatory outputs which are set up in e1 and i1, the i1 signal lags the e1 signal by one-quarter cycle. The frequency of oscillation is determined largely by the feedback gain characteristics, and the signal response levels (voltage-dependent gain curves) in the two elements. These parameters are preferably set to produce oscillation of about 40–80 Hz, using circuit values given above. The oscillation frequency in the unit is also dependent on the mutual (or auto) excitation and inhibition feedback gain parameters in the unit. The more important function of the mutual or auto feedback is to move the resting state of the system closer to the oscillatory state, allowing the unit to switch between resting and oscillatory states within a narrower voltage gain window.

The feedback connections between e1 and i2, and e2 and i1, in a four-element unit of the type shown in FIG. 1, help maintain the frequency stability of the oscillatory. That is, convergence to a common frequency for the entire network is promoted. Although feedback gain values for these connections are not specifically given above, the values are preferably close to the same values as the excitatory and inhibitory feedback gain between the e1 and i1 units, as discussed above. It will be recalled that where the elements e1 and i1 in a network are autoexcited or autoinhibited, the e2 and i2 elements are not present. Similarly, in a large array in which the effect of the e2 and i2 units becomes insignificant, the feedback connections involving the e2 and i2 elements would become correspondingly unimportant.

II. Control System

FIG. 6 shows a schematic of a control system 70 constructed according to the present invention. The system functions, in the learning mode of the device, to calculate and store coupling coefficients, based on the cross-correlation of sampled output signals from different pairs of units in the device. In a pattern-recognition mode, the system operates to distribute to the network, feedback gain whose value is based on the stored coupling coefficients. For simplicity of explanation, the construction and operation of a system designed for an eight-unit network will be described. It will be appreciated, however, how the system can be expanded for use with larger networks.

The system generally includes a central processing unit (CPU) 72 and a pair of multiplexer/demultiplexer units, indicated generally at 74, 76 in FIG. 6. The CPU has an internal memory 78 which can store one or more arrays (matrices) of $k_{ee}^{jk}$ coupling coefficients which are calculated during a learning event, and which may also store sampled signal values taken during operation of the network, for subsequent signal processing. The memory is preferably a conventional random-access memory (RAM). The CPU communicates with the multiplexer/demultiplexer devices through input/output (I/O) ports 80, 82, 84, 86 in a manner to be described. The size, speed, and operational requirements of the CPU will be clear from the described operation of the unit in relation to the functioning of the two multiplexer/demultiplexer units.

The memory is used for storing at least one array, or matrix, of signal coupling coefficients. The coefficients, which are designated $k_{ee}^{jk}$, are determined during the pattern-learning mode of the device, and represent information about the response of the network to the pattern (N-dimensional input vector) being learned. The operation of the system in determining the $k_{ee}^{jk}$ values during a learning operation will be described in the section below. The memory may also be used for storing other $k_{ee}^{jk}$ arrays, related, for example, to a "naive" pre-learning state, and/or to other learned pattern stereotypes.

The $k_{ee}^{jk}$ values are applied to the multiplexer/demultiplexer device which controls the sampling and distribution of excitatory signals only. Although "learned" or pair-specific coupling coefficients can also be applied to the inhibitory elements in the network, the preferred operation of the system uses a fixed-value $k_{ii}^{jk}$ coefficient, typically about 0.25.

Device 74 is designed for multiplexing (sequentially sampling) the output signals of the excitatory elements of the network, and in the pattern-recognition mode, for distributing feedback signals to the e1 elements, where the feedback gain is based on $k_{ee}^{jk}$ values stored in the CPU. The signal sampling is carried out by a multiplexer (MUX) 88 which receives address information from I/O port 80, through a bus 90. In the embodiment shown the multiplexer is an eight-address multiplexer chip which can be operated preferably in the 1-20 kHz range. One suitable chip is a 1H6108 multiplexer/demultiplexer chip available from Intersil (Cupertino, CA) As will be discussed below, the MUX operates at a sampling rate which allows each unit to be sampled at least about four times per cycle. That is, the minimum rate is about 4 times N (the number of network units) times f (the common oscillatory frequency of a unit). For example, in a medium size network containing 128 units, each operating at a frequency of about 50 HZ, the minimum MUX sampling rate would be about 25 kHz. Commercial MUX devices, such as the one just specified, are operable at sampling rates up to several MHz.

The output from MUX 88 is supplied to an eight-bit digital-to-analog converter (DAC) 92 which operates here as a digitally-controlled resistor. The DAC is designed, according to known construction, to provide an output voltage signal whose amplitude is controlled by the value of the digitally-controlled resistance. One suitable DAC is a DAC08 chip obtained from National Semiconductor (Santa Clara, CA), and wired to produce a voltage output signal which is substantially linear with digital input, over a range of input $k_{ee}^{jk}$ values of between about 0.25 and 2.0. The DAC is outputted to an amplifier 100, to form a digitally-controlled gain amplifier between the MUX and DMUX components in the unit.

The $k_{ee}^{jk}$ coefficient values are supplied to the DAC through an eight-line bus 87 from I/O port 84 in the CPU, and an eight-bit latch 94, as shown. The latch is under the control of the CPU, through a line 96 connected to the the CPU's outport port 82. The latch is used to control, through signaling from the CPU, the input of $k_{ee}^{jk}$ values to the DAC from the CPU. One latch suitable for the purpose is a 373 integrated circuit latch commercially available from Texas Instruments.

The digitally-controlled signals from amplifier 100 are distributed to the inputs of the e1 elements in the network by a demultiplexer (DMUX) 102, whose eight output terminals are connected to the inputs of the eight e1 network elements. The address of the DMUX is set by the CPU, communicating with the DMUX through a bus 104 connected to the CPU port 86. Suitable 8-channel DMUX devices are commercially available.

As will be seen below, the DAC and DMUX are switched approximately N times per MUX sampling, to distribute each sampled value over the N units of a network. Therefore, the DAC and DMUX must each be capable of operation at a speed which is about N times the MUX sampling speed, i.e., about $4N^2$ f. As an example, a 128-unit network, operating at an oscillatory frequency of about 50 Hz, would operate at a speed of about 3 MHz. Commercially available DACs, such as the one specified above, are capable of operating frequencies of about 1 MHz, and DMUXs, such as the one specified above, at operating frequencies of up to several megaHz.

Device 76, which provides multiplexing and demultiplexing of the inhibitory signals (received from and applied to the i1 elements in the network), is similar to the just-described device 72 in its component construction and interaction with the CPU. Specifically, the device includes a MUX 106 that receives address signals from bus 90, a DAC 108 which receives input $k_{ii}^{jk}$ values from the CPU through bus 94. The input to the DAC is controlled by a latch 110, under the control of the CPU through a line 112. Specifically, the CPU supplies a constant $k_{ii}^{jk}$ value to the latch, except where j=k, in which case $k_{ii}^{jk}$ is set to zero, if autoinhibition is not wanted. The DAC and an amplifier 114 in the device form an amplifier with digitally-controlled gain, and the output of this amplifier is distributed to the eight i1 input terminals in the network by a DMUX 116 whose address is controlled by the CPU through bus 104.

Although the system has been described with respect to an eight-unit network, it will be appreciated that each of the eight-terminal chips can be expanded 8 fold by a second "level" of IC circuit elements, according to known design principles, and that further expansion to a third level of circuit components can be made for expansion up to a 512 unit network. The limiting factor in the size and speed of the device is memory retrieval time for each step of the multiplexer.

The system also includes an analog-to-digital convertor 118 capable to converting the multiplexed excitatory output signals from MUX 88 to digital values suitable for storage and/or digital display. The ADC is preferably connected to the CPU for signal input and storage, for latter use in determining excitatory gain feedback values ($k_{ee}{}^{j,k}$) related to a learned state.

In operation, the excitatory gain ($k_{ee}{}^{j,k}$) applied to the e1 elements of the network acts to shift the units receiving the gain toward an oscillatory state, making them more susceptible to firing at lower input voltage surge. In this way, learned coupling between two units tends to place both units into oscillation (or shift them toward an oscillatory state) when an above-threshold surge is applied to one of the units only. The excitatory feedback shifts the frequency of oscillation somewhat downward, typically less than about 20%. At the same time, negative distributed feedback, $k_{ii}{}^{j,k}$ applied to the network through the second MUX/DMUX unit also produces a shift in the network toward an oscillatory state, but in a direction which tends to raise the frequency of oscillation, i.e., in a direction that partially offsets the effect of the excitatory distributed feedback.

Figure 7:
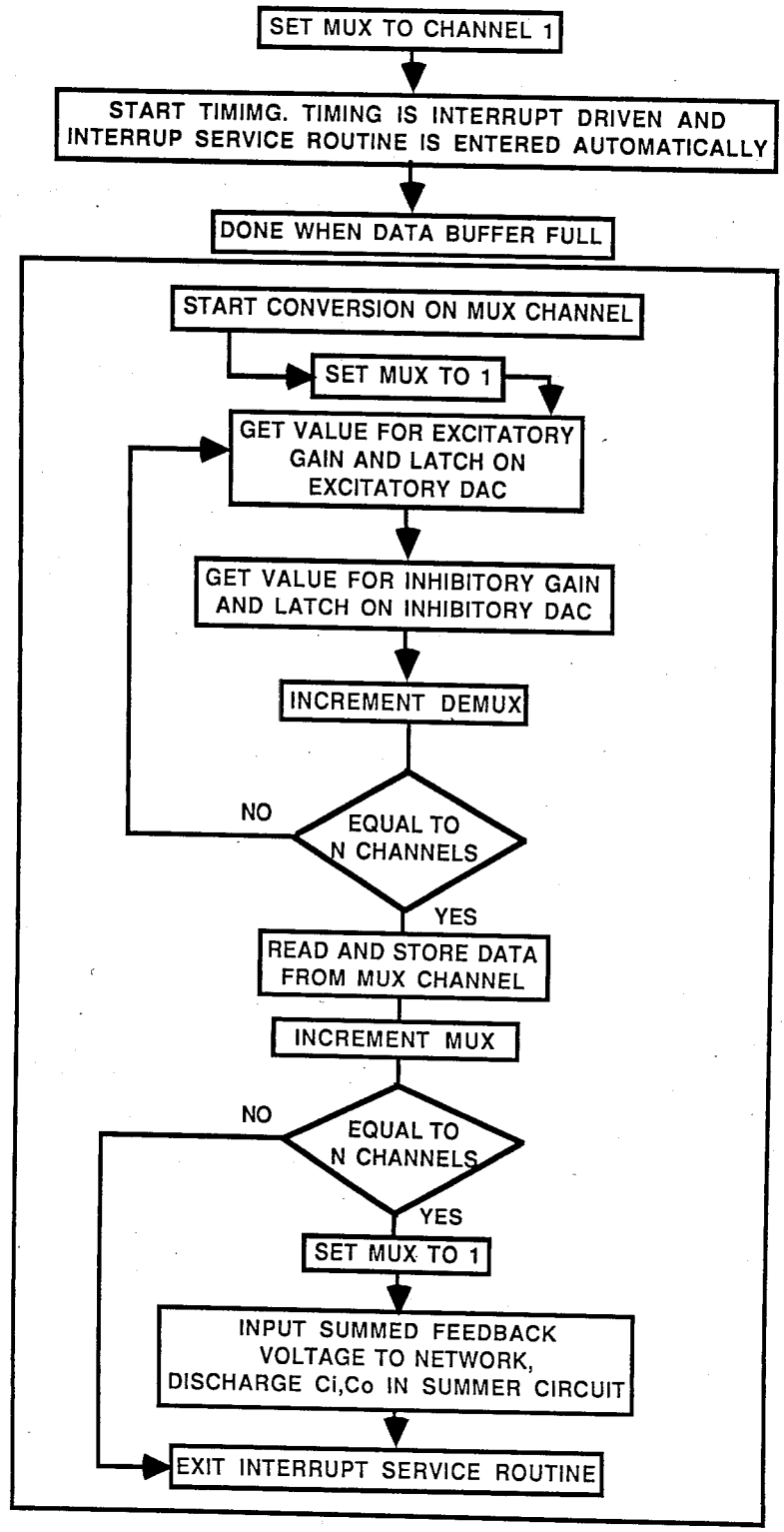
FIG. 7 is a flow diagram of multiplexing and demultiplexing operations carried out by the control system.
Figure 9:
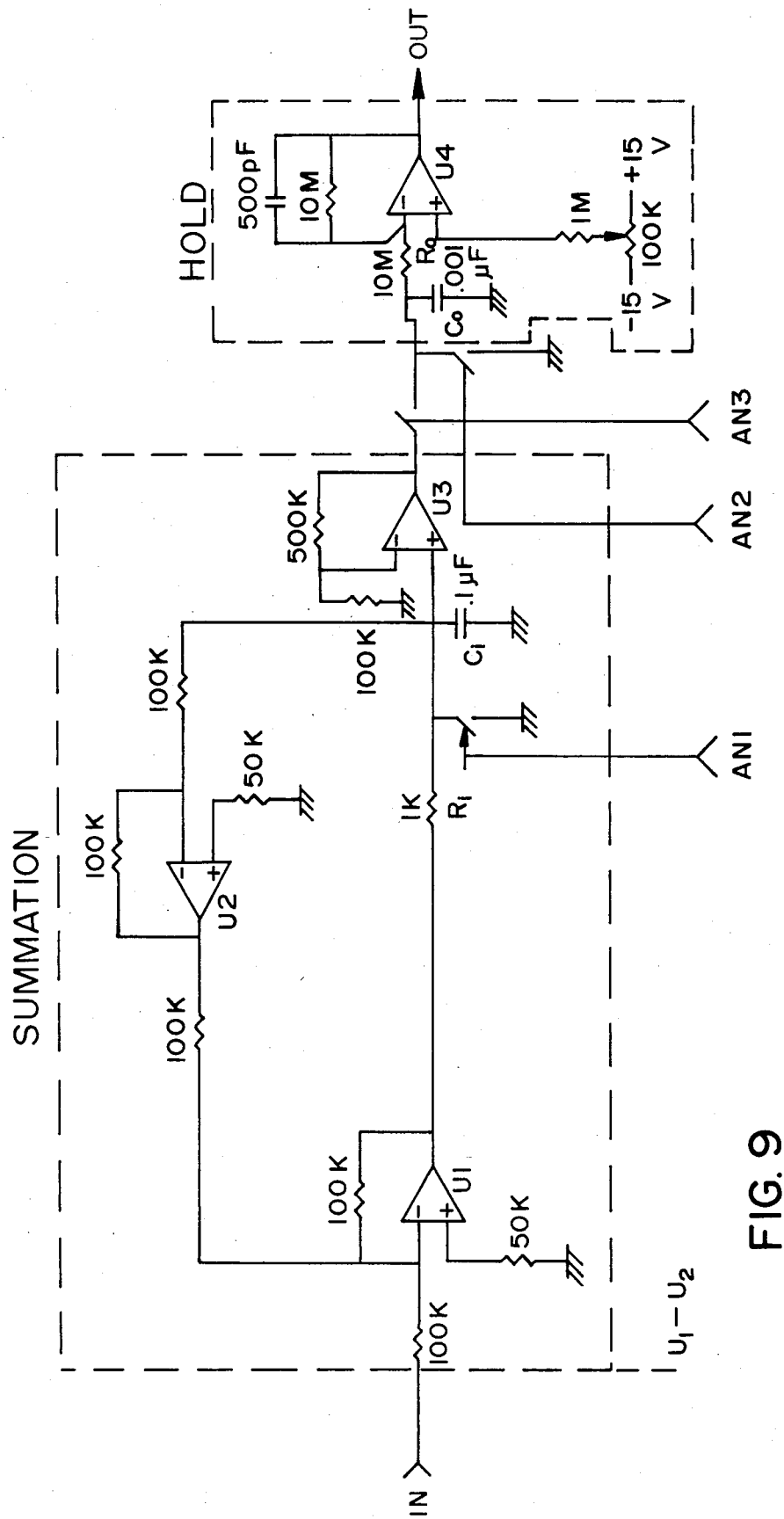

FIG. 7 is a flow diagram of the operation of system 70, as it applies to the excitatory MUX/DMUX device operating in a pattern-recognition mode. This operation, and the synchronous operation of the inhibitory MUX/DMUX device, is executed by the CPU under control of a software program. One software program for carrying out the desired system control is attached hereto as Appendix 1. The program is written in BASIC and 6502 ASSEMBLY language.

With reference to the figure, the MUX address j is initialized at 1, setting each MUX to sample the e1 and i1 elements of the first network unit. The program then resets a timer of an interrupt service routine (enclosed in the large box in the figure) whose timed duration is optimized to allow completion of the interrupt service routine before the routine is restarted. With the program in the service routine, each DMUX address k is also initialized at 1, to set that DMUX for distributing the sampled signal to the first e1 or i1 element. The value of $k_{ee}{}^{j,k}$, which has been earlier calculated and stored in the CPU memory, is retrieved, and latched on the excitatory DAC, and the inhibitory value $k_{ii}{}^{j,k}$ (typically a constant) is retrieved and latched on the inhibitory DAC. In order to avoid self-feedback, the $k_{ee}{}^{j,k}$ and $k_{ii}{}^{j,k}$ values are set to zero when j=k. Thus when the first-unit input signal is seen by each MUX, it is amplified, according to the value of retrieved feedback gain, and applied to the input of the first-unit e1 or i1. The system then increments k by 1, sets each DMUX to the incremented k address, calls up the $k_{ee}{}^{j,k+1}$ and $k_{ii}{}^{j,k+1}$ values, and latches them on the associated DAC and to provide the appropriate gain of the first unit e1 or i1 signal to the second-unit e1 or i1 unit. This cycling is continued unitl the DMUX has cycled through all of the units (k=N). At this point each MUX is incremented, and if the incremented MUX value is less than N, the program exits the service routine, waits for the timer to complete its service routine timing, and then goes back into the service routine, to perform second-unit sampling and demultiplexing, as just described. When the MUX value reaches N the program returns to the beginning, and continues sampling and demultiplexing in this manner unitl the data buffer is full.

Thus, the system operates to (1) sample each e1 and i1 elements successively, (2) with each e1 sampled output value, distribute the e1 signal, multiplied by a unit-specific gain function, successively to the e1 elements in each of the other N-1 units in the network, and (3) with each i1 sampled output value, distribute the i1 value, multiplied by a constant gain value, to the i1 element in each of the other N-1 units in the network.

In very large arrays, a preferred mode of operation is to have only two values for the $k_{jk}$, which are "low" (e.g., 0.7) for the naive or untrained connection state, and "high" (e.g., 1.3) for the trained connection state. Two amplifiers are provided between the MUX and DMUX that are accessed by a binary digital switch. The connection for each MUX/DMUX setting $k_{jh}$ is stored as a single bit (0,1) in a word in computer memory (e.g., 32 to 60 bits/word). Words are retrieved and stored in double buffer, where they are held for rapid access by DMUX under control of a subsidiary timer linked to the master clock.

The control system provides two important advantages over physical inter-unit feedback connections, such as have been used in constructing prior-art parallel-processing pattern learning and recognition devices. First, the system avoids physical feedback connections between pairs of units. Assuming global connection between each pair of units in an N unit network would require $N^2$ inter-unit connections. Topological and distance constraints imposed by interconnections between large numbers of spaced pairs of units impose a serious constraint on the size of networks which can be readily constructed by VLSI techniques. By contrast, the present system requires only 2N connections for an N-unit network, and avoids crossing and/or lengthy feedback connections. Hence networks with sizes from 64 up to 1024 units or greater can be readily constructed by VLSI techniques.

The system also avoids the problem of physically altering the feedback gain strengths among the units, in response to pattern learning. Here, the learned feedback values are readily calculated, stored and updated by high-speed digital processing.

III. Operation

The apparatus of the invention functions in two modes: pattern learning and pattern recognition. In the learning mode, the device operates to transform pattern-related information into an array of coupling coefficients which relate the signal outputs in the excitatory elements of different pairs of network units, in response to the pattern-related signal. The types of patterns which can be handled by the device, and the transform operation carried out by the device are considered in part A below.

The learned array of coefficients defines an attractor cycle which has a recognizable oscillatory output pattern, and typically, the pattern of oscillation seen in the N e1 network elements during the period when the network is stimulated by the pattern of interest. The attractor cycle is analogous to a local minimum on a surface in the sense that any pattern within the "basin" of the cycle attractor will cause the network to converge to the learned cycle attractor. The device is thus able to discriminate patterns which are related to a learned pattern from those that are not, on the basis of convergence to a defined cycle attractor. The details of the pattern-recognition operation, and applications to a variety of pattern-recognition and problem-solving capabilities are discussed in part B below.

A. Pattern Learning

As defined herein a "pattern" is any field of information which may be represented as an N-dimensional vector, where the N-vector components are or may be converted to voltage pulse inputs. Input to the network is preferably through an input stage in which a voltage surge is generated which consists of a gate or step with rounded edges that starts and stops the device in a time frame lasting on the order of 0.1–1.0 seconds. The surge input signal may repeat regularly or at selected intervals. The amplitude of the surge, at each of the N units in the network, is determined by a sensor or other input device. The N-dimensional vector is thereby expressed by the amplitude modulation of the surge given concomitantly to all of the elements of the array, including the possibility for zero and negative amplitudes. The magnitude of the surge is limited both locally and globally by suitable normalizing transforms so as to preserve input patterns while keeping the input domain within the optimal dynamic range of the device.

The pattern represented by the N-dimensional input vector is typically a scene which is converted to a digitized image composed of an array of pixels, each with a defined pixel intensity values between, for example, 0 and 511. For purposes of the present invention, this image may be considered as a string of N intensity values, each of which can be converted, by a suitable digital-to-analog device to an array of voltage surges whose amplitudes are proportional to the digital intensity value.

Another important application of the invention is in recognizing auditory patterns, such as verbal commands which are to be received and acted on by a computer. Here the pattern may be represented as an array of frequency and amplitude values which are sampled at several time intervals over the period of the verbal input. For example, if the pattern is sampled m times, the pattern can be represented as a string of m subarrays, each containing N/m frequency and/or amplitude values related to the sampled interval.

Often the pattern to be analysed has little or no spatial and/or temporal relationship among its components. This would be the case, for example, in processing patterns of signals received from an array of seismic detectors spread out over a large area of the earth, or a group of radiotelescopes located at several different earth or satellite locations, provided that each input component in the N vector is presented as a scalar amplitude. An input component may of course be any combination of values from an array of sensors. The N components must be representative in or across the time window of the sample period preceding the bifurcation from rest to the active state.

The pattern may also take the form of a complex differential or muti-variable set of equations, where the vector components are coefficients (typically trial coefficients) which can be adjusted and refined, during operation of the device, to improve the solution(s) of the equation.

In the simplest case, the device is in a naive condition in which no pattern-related information is contained in the control system. Typically, all of the $K_{ee}^{jk}$ values are set to a common gain, e.g., 0.25. The pattern to be learned is then applied to the network, by inputting each of the N component voltage pulses representing the pattern in a corresponding e1 element of the network. In particular, the input pattern has some voltage components above the threshold voltage required for bifurcation in the receiving network element, and some below this threshold. Upon initial input, some pattern-related group of the network units will be driven into an oscillatory state. As the outputs of the units are sampled, amplified, and fed back into the network, by the MUX/DMUX operations described above, the system will rapidly converge to an attractor cycle in which a defined pattern of units show oscillation. The convergence involves both a convergence of the excited oscillatory units to a common frequency and phase, and a convergence of the pattern of oscillatory units. Both types of convergence are imposed by the extensive feedback connections within the network supplied by the control system.

Figure 8A:
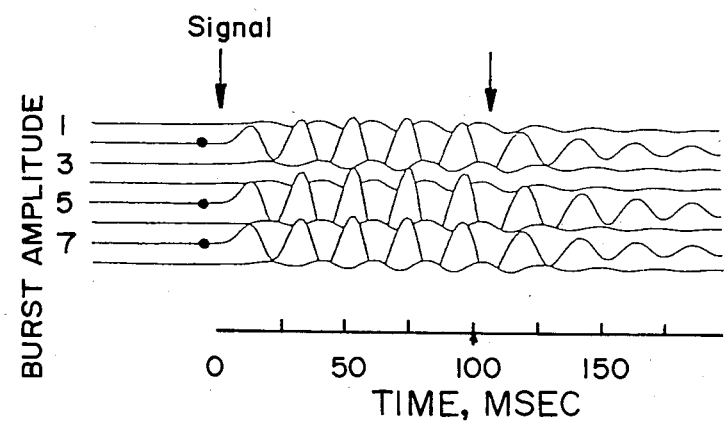
FIGS. 8A and 8B show typical output signal patterns in an eight-unit network constructed according to the invention, during a pattern learning mode (8A) and a reconstructed pattern of outputs in a pattern completion and pattern recognition mode (8B).

A typical attractor cycle produced by an 8-D vector input is illustrated in FIG. 8A, which shows the oscillatory signal outputs of the eight e1 elements in an 8-unit network. The 8-component input vector contained above-threshold voltage levels (solid circles) in the components applied to the number 2, 5, and 7, e1 elements, and low, subthreshold voltage surges in the remaining components. Correspondingly, the output pattern is characterized by strong oscillation in units 2, 5, and 7, and low-level signal activity in the remaining five units. It is emphasized, however, that more global oscillation could be produced, if desired, by lowering the firing threshold of the network units, and/or increasing the excitatory gain—either $k_{ee}$ or $k_{ee}^{jk}$ values—applied to the system.

FIG. 8A also illustrates the important bifurcation feature of the network described herein. With pattern input, the network bifurcates to an active oscillatory state, and with cessation of the signal, it bifurcates back to a non-oscillatory resting state, by rapid signal decay, typically about 100 msec. This allows the device to rapidly respond to a series of input patterns, without the need to stop the device and reset before each pattern input.

The coupling coefficients which contain the learned information are determined by cross-correlating pairs of output signals generated by the network. Operationally, this is done by the feeding a portion of the sampled output signal from MUX 92 in the control system to the CPU, where the signal values are stored for later cross-correlation calculations, which are performed conventionally by the CPU. The calculated values of the cross-correlation integrals are normalized to fall within a specified range of coefficients, e.g., 0 to 2.0, and these coefficients are stored in the CPU memory as an array of learned $k_{ee}^{jk}$ values.

Using the example in FIG. 8A, the signal outputs from units 2 and 5, units, 5 and 7, and 2 and 7 would show high cross-correlation, and therefore the calculated $k_{ee}^{2,5}$, $k_{ee}^{5,7}$, and $k_{ee}^{2,7}$ would be relatively large. Conversely, other signal output pairs such as 2 and 1, 2 and 3, would give low $k_{ee}^{jk}$ values.

The device can also be taught additional patterns, by superimposing new pattern information on the existing learned $k_{ee}{}^{jk}$ array. Here the network is operated with the existing learned $k_{ee}{}^{jk}$ values, while the new pattern to be learned is applied to the network. Thus the pattern of output signals which are correlated represent contributions from both the already-learned pattern and the new pattern. The newly calculated cross-correlation values replace the existing ones in the stored matrix. Use of the device for learnaing multiple patterns is best suited to large networks.

B. Pattern Recognition

Pattern recognition has two general aims. The first is simple pattern classification, i.e., to determine whether a given input pattern is or is not in a learned pattern class. The second aim is pattern completion, which involves extracting a complete pattern from partial pattern information supplied to the recognition device. This latter feature is sometimes called associative memory, in analogy with the ability of the brain to associate or reconstruct detail from a partial or incomplete pattern input. Since simple pattern classification is a trivial example of pattern reconstruction, only the latter type of pattern recognition will be considered.

Figure 8B:
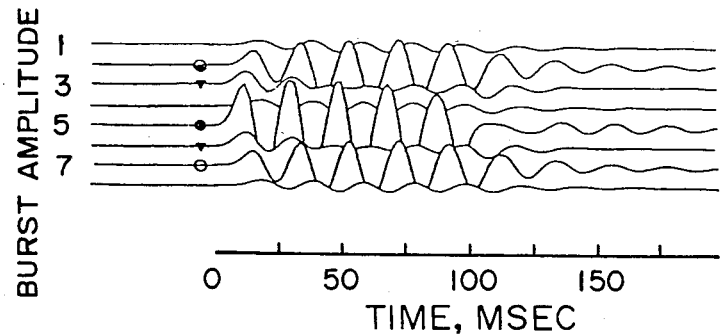

The use of the device in pattern reconstruction will be considered with reference to FIGS. 8A and 8B. FIG. 8A, it is recalled, is the output signal pattern produced by the device during a learning-mode input, i.e., with the $k_{ee}{}^{jk}$ values set to some arbitrary value(s). In FIG. 8B, it is assumed that the pattern to be recognized contains only a portion of the information provided to the device during learning. In particular, it will be assumed that the pattern has a subthreshold, intermediate-voltage value (half-closed circle) as its second component, an above-threshold voltage value as its fifth component (closed circle), and that all other vector input components are low voltage surges. The pattern to be recognized thus lacks information contained in the second and seventh components of the learned.

The input signal initial causes excitation in the fifth unit of the network. The higher voltage output sampled from this unit is then distributed, by the MUX/DMUX operation of the control system, as increased-voltage feedback to the second and seventh units, by virtue of the relatively high learned feedback coefficients relating unit 5 to both unit 2 and unit 7. It is assumed that the feedback applied to unit two now excites that unit into an oscillatory state, providing additional feedback, through the MUX/DMUX operation, to both units 5 and 7, now causing unit 7 to oscillate. The mutual feddback among these three units sets up a rapid convergence to a bifurcated network state in which all three units show strong oscillation, as illustrated in FIG. 8B.

The signal output pattern, such as that shown in FIG. 8B, can be obtained from the MUX-sampled output signals after analog-to-digital conversion, or alternatively, by separate output lines from each of the excitatory elements in the network after ADC. The signal output pattern observed can be compared with the learned pattern, for purposes of pattern classification, by a variety of known signal analysis methods involving digital computations. For example, the signal outputs can be converted to an N-dimensional vector of frequency, signal amplitude, or power values, and compared with the analogous learned pattern vector. Alternatively, the signal output patterns can be expressed in terms of the spatial covariance between pairs of output signals, and the covariance values for the generated pattern compared with that of the learned pattern.

From the foregoing, it can be appreciated how various objects and features of the invention are met. The device combines the rapid parallel processing and convergence properties of muti-unit networks with the data-handling flexibility and computational power of a digital computer. In particular, a new learned state is readily incorporated into the device by the steps of (a) driving the network with a given-pattern input, (b) using the digital processor to record and store network outputs, and (c) using the digital processor to calculate weighted feedback values for individual pairs of network unit outputs.

The network construction is greatly simplified, since pairwise feedback connections between network units are not required, allowing for larger and more versatile networks to be constructed, e.g., by VLSI methods. Further, the hybrid device is suitable for any network which involves parallel processing of parallel input signals, with output of parallel time-varying signals which converge to a point attractor (monotonic signal) or cycle attractor (oscillatory signal).

In a preferred embodiment, the network elements are non-linear integrative elements which have internal feedback adjusted to give desired oscillatory characteristics, and the resting biases of the elements which permit bifurcation from rest to oscillatory states, and back to a rest state, with a voltage surge input. The device thus has the capability for processing rapidly and repeatedly sequential frames without having to shut down the system in order to get it "unstuck" from asynystatic convergence to a "full-on" point attractor.

The feedback interconnections between the units, supplied by the digital processor, cause rapid convergence of the network to a cycle attractor (learned state). Due to the fact that the oscillation is a property of the entire array, the instantaneous frequency of oscillation for all elements will be the same. A common basis function can be ascribed to the entire set of outputs. Deviations such as local time lags and peculiarities of the envelopes of amplitude and frequency modulation disappear under spatial integration and can be safely ignored. The entire output for each frame consists in the N-scalar values for amplitude of the common basis function or output wave form. The outputs for a class of inputs form a hyperellipsoid in N-dimensional space. The centroid is the "location" of the stereotypic or prototypic output. Each test event can be classified in N-space by the minimal Euclidean distance to a hypercentroid established over sets of learning events.

Another advantage of the particular network shown is the flexibility afforded to an operator interacting with the system online in real time and the several parametric controls available. These include input time of onset, surge duration, mean surge amplitude, variable compression of dynamic range, rest bias level, height/slope of the sigmoid curve, and internal feedback settings. A pattern of input that evolves slowly (with respect to the surge repetition rate) can be followed over time, or a single surge (frame) can be frozen and subjected to repeated examination by an operator seeking to optimize output.

Although the device of the invention has been described with respect to preferred embodiments and modes of operation, it will be appreciated that various changes and modifications, for example, application of the hybrid network/processor to other types of networks, can be made without departing from the invention.

It is claimed:

1. A parallel-circuit signal processing device comprising
   a series of N integrative units $U_j$, each constructed to respond to the jth component of an N-dimensional input vector, to produce a time varying output signal $O_j$,
   a multiplexer for sequentially sampling the $O_j$ values in each of the N receptor units,
   means storing a matrix of $k_{ee}{}^{jk}$ coupling coefficients relating the output signal coupling between pairs of $U_j$, $U_k$ units in the device,
   means for calculating, for each $O_j$ value sampled by said multiplexer, feedback input signals which relate the just-sampled $O_j$ value and the $k_{ee}{}^{jk}$ coupling coefficients between $U_j$ and other units in the device, and
   a demultiplexer for applying, following each $O_j$ value sampled by the multiplexer, the feedback signals just calculated on the basis of the sampled $O_j$ value, to each of the corresponding units $U_k$.

2. The device of claim 1, for use in learning a class of patterns which can be represented by one or more related N-dimensional vectors, which further includes means for determining coupling coefficients $k_{ee}{}^{jk}$ between pairs of output signals $O_j$, $U_k$, based on the cross-correlation of the pairs of output signals $O_j$, $U_k$ produced in response of the device to one of such related vectors.

3. The device of claim 1, wherein the integrative unit includes an integrator whose output is connected to a pair of opposed-polarity diodes in the unit, to produce an output signal $O_j$ with bilateral saturation characteristics, the resting bias of the unit is substantially below the input voltage level which produces maximal gain in the unit, and each unit, upon receiving its excitatory-level input vector component, is shifted to a different gain condition.

4. The device of claim 3, wherein the input vector components are surge voltages and those units which are excited from a resting bias to maximal or near-maximal gain levels by input level components return to the resting bias condition after cessation of the inputed component voltage pulses.

5. The device of claim 4, wherein the integrative units are constructed to produce a monotonic or oscillatory signal upon shift of the gain in the individual units to above-bifurcation levels, and to revert to resting states when the gain reverts to its resting bias.

6. The device of claim 5, wherein each integrative unit is composed of an excitatory element, and inhibitory element, and a negative feedback connection between the two, and the input vector component is applied to the excitatory element.

7. The device of claim 6, wherein each excitatory and inhibitory element in an integrator whose signal is passed through a pair of opposed-polarity diodes.

8. The device of claim 5, wherein the excitatory element is coupled in negative feedback with itself or a second excitatory unit, and the inhibitory element is coupled in negative feedback with itself or a second inhibitory element.

9. The device of claim 5, for use in associating an input pattern with a learned stereotypic pattern, where the N-dimensional vector representing the learned pattern produces a limit cycle attractor in the device which is characterized by a given pattern of oscillation in the N units, wherein the N-dimensional pattern representing the input pattern produces a bifurcation in the device to the limit attractor cycle, in which case the new pattern is recognized as related to the learned pattern, or to some other attractor cycle characterized by a different pattern of output oscillations in the units, in which case the pattern is recognized as not related to the learned pattern.

10. The device of claim 1, wherein the rest state of the device is a non-oscillatory point attractor state.

11. The device of claim 1, wherein the rest state of the device is a chaotic cycle attractor characterized by random oscillatory signals in the units.

12. The method of processing patterns which are representable as N-dimensional vectors comprising
   providing a series fo N receptor units $U_j$, each constructed to respond to the ith component of an N-dimensional input vector, to produce a time varying output signal $O_j$,
   sequentially sampling the $O_j$ values in each of the N receptor units,
   storing a matrix of $k_{ee}{}^{jk}$ coupling coefficients relating the output signal coupling between pairs of $U_j$, $U_k$ units in the device,
   calculating, for each $O_j$ value sampled, feedback input signals which relate the just-sample $O_j$ value and the $k_{ee}{}^{jk}$ coupling coefficients between $U_i$ and other units in the device, and
   following each $O_j$ value sampled, applying the feedback signals just calculated on the basis of the sampled $O_j$ value, to each of the corresponding units $U_k$.

* * * * *